US009135912B1

(12) United States Patent
Strope et al.

(10) Patent No.: US 9,135,912 B1
(45) Date of Patent: Sep. 15, 2015

(54) UPDATING PHONETIC DICTIONARIES

(71) Applicant: Google Inc., Mountain View, CA (US)

(72) Inventors: Brian Strope, Palo Alto, CA (US); Leonid Velikovich, New York, NY (US)

(73) Assignee: Google Inc., Mountain View, CA (US)

( * ) Notice: Subject to any disclaimer, the term of this patent is extended or adjusted under 35 U.S.C. 154(b) by 120 days.

(21) Appl. No.: 13/622,547

(22) Filed: Sep. 19, 2012

Related U.S. Application Data

(60) Provisional application No. 61/683,445, filed on Aug. 15, 2012.

(51) Int. Cl.
*G10L 15/00* (2013.01)
*G10L 15/26* (2006.01)
*G10L 15/187* (2013.01)

(52) U.S. Cl.
CPC .......... *G10L 15/187* (2013.01); *H03M 2201/40* (2013.01)

(58) Field of Classification Search
CPC ............ G06F 17/30864; G06F 17/273; G06F 17/276; G10L 13/08; G10L 15/24; G10L 15/26
USPC .............................. 704/9, 231, 235
See application file for complete search history.

(56) References Cited

U.S. PATENT DOCUMENTS

| 6,064,957 | A | | 5/2000 | Brandow et al. | |
|---|---|---|---|---|---|
| 6,064,959 | A | * | 5/2000 | Young et al. | 704/251 |
| 6,078,885 | A | * | 6/2000 | Beutnagel | 704/258 |
| 6,233,553 | B1 | * | 5/2001 | Contolini et al. | 704/220 |
| 6,269,335 | B1 | * | 7/2001 | Ittycheriah et al. | 704/270 |
| 6,389,395 | B1 | * | 5/2002 | Ringland | 704/254 |
| 6,411,932 | B1 | * | 6/2002 | Molnar et al. | 704/260 |
| 6,684,185 | B1 | * | 1/2004 | Junqua et al. | 704/243 |
| 6,912,498 | B2 | * | 6/2005 | Stevens et al. | 704/235 |
| 6,976,019 | B2 | * | 12/2005 | Davallou | 1/1 |
| 7,062,482 | B1 | * | 6/2006 | Madan et al. | 707/758 |
| 7,120,582 | B1 | * | 10/2006 | Young et al. | 704/255 |
| 7,181,388 | B2 | * | 2/2007 | Tian | 704/10 |
| 7,212,968 | B1 | * | 5/2007 | Garner et al. | 704/251 |

(Continued)

FOREIGN PATENT DOCUMENTS

EP 1321926 A1 * 6/2003 ............. G10L 15/22

OTHER PUBLICATIONS

Kristina Toutanova and Robert C. Moore. 2002. Pronunciation modeling for improved spelling correction. In Proceedings of the 40th Annual Meeting on Association for Computational Linguistics (ACL '02). Association for Computational Linguistics, Stroudsburg, PA, USA, 144-151.*

(Continued)

*Primary Examiner* — Matthew Baker
(74) *Attorney, Agent, or Firm* — Fish & Richardson P.C.

(57) ABSTRACT

Methods, systems, and apparatus, including computer programs encoded on a computer storage medium, for updating phonetic dictionaries. In one aspect, a method includes accessing a phonetic dictionary that identifies terms and one or more phonetic representations associated with each term, determining that a particular term that is identified in the phonetic dictionary is a spelling correction for another term that is identified in the phonetic dictionary, and storing, in the phonetic dictionary, one or more of the phonetic representations associated with the other term, with the particular term that is a spelling correction for the other term.

14 Claims, 4 Drawing Sheets

(56) References Cited

U.S. PATENT DOCUMENTS

| | | | |
|---|---|---|---|
| 7,277,851 B1* | 10/2007 | Henton | 704/235 |
| 7,310,602 B2* | 12/2007 | Takaichi et al. | 704/252 |
| 7,315,818 B2 | 1/2008 | Stevens et al. | |
| RE40,458 E* | 8/2008 | Fredenburg | 704/1 |
| 7,412,441 B2* | 8/2008 | Scott et al. | 1/1 |
| 7,430,503 B1* | 9/2008 | Walker | 704/8 |
| 7,467,087 B1* | 12/2008 | Gillick et al. | 704/260 |
| 7,590,533 B2* | 9/2009 | Hwang | 704/231 |
| 7,590,605 B2* | 9/2009 | Josifovski | 706/29 |
| 7,853,874 B2* | 12/2010 | Schabes et al. | 715/257 |
| 7,974,844 B2* | 7/2011 | Sumita | 704/257 |
| 8,195,456 B2* | 6/2012 | Roesser et al. | 704/231 |
| 8,244,521 B2* | 8/2012 | Dolan | 704/9 |
| 8,275,621 B2* | 9/2012 | Alewine et al. | 704/260 |
| 8,301,446 B2* | 10/2012 | Shu | 704/251 |
| 8,341,520 B2* | 12/2012 | Iakobashvili et al. | 715/257 |
| 8,346,561 B2* | 1/2013 | Behbehani | 704/270 |
| 8,543,378 B1* | 9/2013 | Westphal | 704/9 |
| 2002/0156776 A1* | 10/2002 | Davallou | 707/3 |
| 2005/0203738 A1* | 9/2005 | Hwang | 704/243 |
| 2005/0210383 A1* | 9/2005 | Cucerzan et al. | 715/533 |
| 2006/0190256 A1* | 8/2006 | Stephanick et al. | 704/252 |
| 2006/0253427 A1* | 11/2006 | Wu et al. | 707/3 |
| 2007/0213983 A1* | 9/2007 | Ramsey | 704/254 |
| 2009/0043584 A1* | 2/2009 | Philips | 704/260 |
| 2010/0318361 A1* | 12/2010 | Paulino et al. | 704/260 |
| 2011/0022952 A1* | 1/2011 | Wu et al. | 715/257 |
| 2011/0184723 A1* | 7/2011 | Huang et al. | 704/8 |
| 2012/0246133 A1* | 9/2012 | Hsu et al. | 707/706 |
| 2012/0284308 A1* | 11/2012 | Paduroiu | 707/780 |
| 2013/0282645 A1* | 10/2013 | Culbertson et al. | 706/52 |

OTHER PUBLICATIONS

Eric Brill and Robert C. Moore. 2000. An improved error model for noisy channel spelling correction. In Proceedings of the 38th Annual Meeting on Association for Computational Linguistics (ACL '00). Association for Computational Linguistics, Stroudsburg, PA, USA, 286-293.*

Slobada, T.; Waibel, A.; "Dictionary learning for spontaneous speech recognition," Spoken Language, 1996. ICSLP 96. Proceedings., Fourth International Conference on, vol. 4, No., pp. 2328-2331 vol. 4, Oct. 3-6, 1996.*

Choueiter, G.F.; Seneff, S.; Glass, J.R.; "Automatic lexical pronunciations generation and update," Automatic Speech Recognition & Understanding, 2007. ASRU. IEEE Workshop on, vol., No., pp. 225-230, Dec. 9-13, 2007.*

Fackrell, Justin / Skut, Wojciech (2004): "Improving pronunciation dictionary coverage of names by modelling spelling variation", In SSW5-2004, 121-126.*

Yaser Al-Onaizan and Kevin Knight. 2002. Machine transliteration of names in Arabic text. In Proceedings of the ACL-02 workshop on Computational approaches to semitic languages (SEMITIC '02). Association for Computational Linguistics, Stroudsburg, PA, USA, 1-13.*

Duan, Huizhong, and Bo-June Paul Hsu. "Online spelling correction for query completion." Proceedings of the 20th international conference on World wide web. ACM, 2011.*

Bassil, Youssef, and Mohammad Alwani. "Post-Editing Error Correction Algorithm for Speech Recognition using Bing Spelling Suggestion." arXiv preprint arXiv:1203.5255 (2012)—vol. 3, No. 2—note that the numbers publish monthly one month afterwards, Mar. 2012.*

* cited by examiner

UPDATING PHONETIC DICTIONARIES

CROSS-REFERENCE TO RELATED APPLICATIONS

This application claims the benefit of U.S. Provisional Patent App. No. 61/683,445, filed Aug. 15, 2012, the disclosure of which is incorporated herein by reference.

BACKGROUND

The present specification relates to speech recognition and, according to one particular implementation, to updating phonetic dictionaries.

Automated speech recognition (ASR) systems may be used transcribe words spoken by a user. Some speech recognition systems may use phonetic dictionaries (i.e., lists of words and their phonetic spellings) when performing transcription. Acoustic signals produced by a speaker may be mapped to phones (i.e., speech sounds), which may in turn be used to identify possible corresponding words, by referencing a phonetic dictionary. Phonetic dictionaries have generally been compiled by including pronunciation guides from standard language dictionaries, and by manually labeling acoustic examples of various words spoken by various speakers.

SUMMARY

According to one innovative aspect of the subject matter described in this specification, spelling correction technology may be leveraged to enhance entries in a phonetic dictionary, to thereby improve speech recognition accuracy. Specifically, when a first term in a phonetic dictionary is identified as a spelling correction for a second term (e.g., a common misspelling of the first term), an ASR system may identify and/or generate phonetic representations of the first and second terms, and may infer that the phonetic representation of the second term is more accurate than the phonetic representation associated with the first term. Accordingly, the phonetic representation associated with the second term is associated with the first term in the phonetic dictionary. The phonetic representation that was originally associated with the first term, and/or the second term and the phonetic representation associated with the second term, may be deleted from the phonetic dictionary under appropriate conditions.

As another innovative aspect of the subject matter described in this specification, a process includes accessing a phonetic dictionary that identifies terms and one or more phonetic representations associated with each term, determining that a particular term that is identified in the phonetic dictionary is a spelling correction for another term that is identified in the phonetic dictionary, and storing, in the phonetic dictionary, one or more of the phonetic representations associated with the other term, with the particular term that is a spelling correction for the other term.

Other embodiments of these aspects include corresponding systems, apparatus, and computer programs, configured to perform the actions of the methods, encoded on computer storage devices.

These and other embodiments may each optionally include one or more of the following features. For instance, a data representation of an utterance is received in which a user has spoken the particular term, and the stored one or more phonetic representations associated with the particular term in the phonetic dictionary are used in outputting the particular term as part of a transcription of the utterance; before accessing the phonetic dictionary, one or more automatically-generated phonetic representation estimates of the particular term are obtained, and the one or more phonetic representation estimates are stored as the one or more phonetic representations associated with the particular term; before accessing the phonetic dictionary, one or more phonetic representations of the particular term are obtained from an external phonetic dictionary, and the one or more phonetic representations are stored in association with the particular term; determining that a particular term that is identified in the phonetic dictionary is a spelling correction for another term that is identified in the phonetic dictionary includes transmitting data identifying at least a portion of the terms in the phonetic dictionary to a spelling correction engine, and receiving data that identifies the particular term as a spelling correction for the other term from the spelling correction engine; data that specifies a spelling correction confidence score is received from the spelling correction engine; the spelling correction confidence score reflects a probability that the particular term is a spelling correction for the other term; determining whether the spelling correction confidence score satisfies a predetermined threshold; the one or more of the phonetic representations associated with the other term are stored with the particular term that is a spelling correction for the other term, only after determining that the spelling correction confidence score satisfies a predetermined threshold; each phonetic representation comprises a phonemic representation; each phonetic representation comprises a sequence of phonemes; the particular term comprises two or more words; after storing the one or more of the phonetic representations associated with the other term, with the particular term that is a spelling correction for the other term, the other term and one or more of the phonetic representations associated with the other term are deleted from the phonetic dictionary; before storing the one or more of the phonetic representations associated with the other term, with the particular term that is a spelling correction for the other term, one or more of the phonetic representations associated with the particular term are deleted from the phonetic dictionary; storing one or more of the phonetic representations associated with the other term, with the particular term that is a spelling correction for the other term includes replacing, in the phonetic dictionary, one or more of the phonetic representations associated with the particular term that is a spelling correction for the other term, with one or more of the phonetic representations associated with the other term.

Advantageous implementations may include one or more of the following features. Automated, data-driven techniques may be used to reveal potential mistakes and omissions in phonetic dictionaries and to improve their suitability for use by speech recognition engines. As new words are added to a language and as acceptable pronunciations for various words change over time, words pronunciations may be dynamically updated in a phonetic dictionary so that the dictionary remains current. Pronunciations may be identified for words without acoustic sample data.

The details of one or more implementations are set forth in the accompanying drawings and the description below. Other potential features and advantages will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
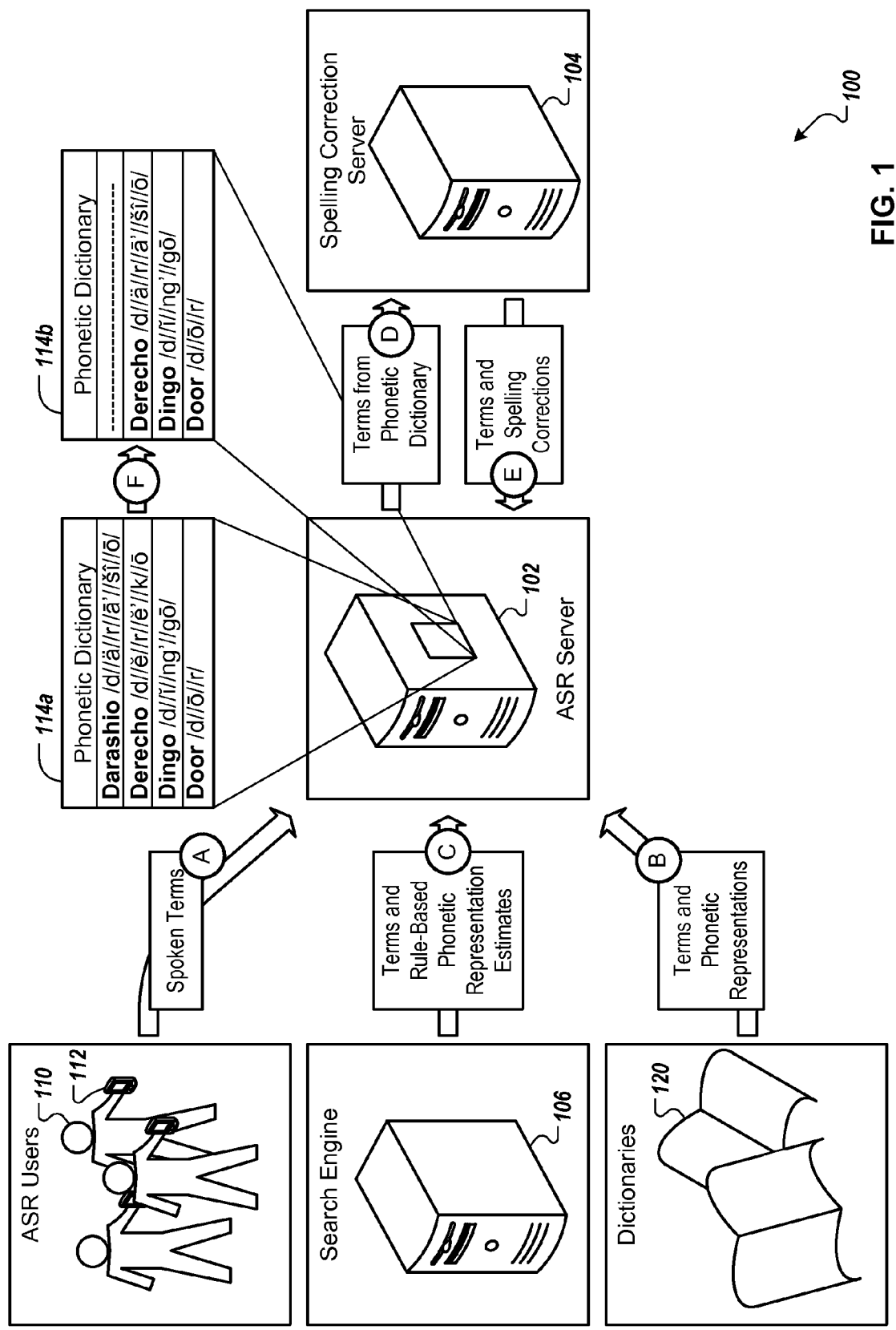
FIGS. 1 and 2 are diagrams of example systems that can update phonetic dictionaries.

FIG. 1 is a diagram of an example system 100 that can update phonetic dictionaries. FIG. 1 also illustrates an example flow of data, shown in stages (A) to (F). Stages (A) to (F) may occur in the illustrated sequence, or they may occur in a sequence that is different than in the illustrated sequence.

In general, phonetic dictionaries may be updated by the system 100 for use in speech recognition. Phonetic dictionaries such as published pronunciation guides may include a list of terms and phonetic representations of the terms. For example, the word "cat" may be included in a phonetic dictionary along with the pronunciation "/k//ae//t/". Upon receiving acoustic signals associated with an utterance of the word "cat", for example, a speech recognition system may identify a series of phones (i.e., speech sounds) included in the utterance. The phones, for example, may be used to reference pronunciations included in the phonetic dictionary to identify one or more words (e.g., the word "cat") that likely correspond to the utterance.

However, if a phonetic dictionary includes incorrect pronunciations (e.g., for the word cat, a pronunciation of "/k//ay//t/"), a speech recognition system may make errors when attempting to recognize words. Incorrect pronunciations may be included in a phonetic dictionary (or correct pronunciations may be missing from the phonetic dictionary) for a variety of reasons, such as phonetic drift (i.e., when a consonant or vowel sound pronounced by a group of speakers mutates over time), the use of common contractions by speakers (e.g., "prolly" or "probly" instead of "probably"), and typographical mistakes, to describe a few possibilities. Moreover, as new words are introduced into a language (e.g., loan words from a foreign language, newly coined terms, etc.), pronunciations for the words may not yet be standardized or documented.

Speech recognition results may be combined with spelling correction results to identify word pronunciations, and to reveal possible mistakes and exclusions in phonetic dictionaries. For example, a user may utter the word "derecho" (i.e., a type of windstorm) with a particular pronunciation (e.g., rhyming with "ratio"), and the utterance may be provided to a speech recognition engine for transcription. However, in the present example, the word "derecho" may be currently associated with an incorrect pronunciation (e.g., rhyming with "echo") in a phonetic dictionary. Thus, the speech recognition engine in the present example may fail to correctly identify the utterance, and may instead produce a transcription of the uttered word to reflect its constituent phones (e.g., "darashio").

Upon providing the transcribed word to a spelling correction engine, for example, the engine may identify "darashio" as a common misspelling of the word "derecho". In general, users may tend to misspell words in such a way that a misspelling more accurately reflects a word's correct pronunciation than does a correct spelling. Thus, in the present example, upon identifying the spelling correction, the phonetic dictionary may be updated such that the entry for a correctly spelled word (e.g., "derecho") is associated with a pronunciation of its incorrectly spelled counterpart (e.g., "darashio"). When receiving future utterances of the word "derecho", for example, the speech recognition engine may use the updated phonetic dictionary to correctly recognize the word.

In further detail, the system 100 includes an automated speech recognition (ASR) server 102, a spelling correction server 104, and a search server 106. The computing servers 102, 104, and 106 may include one or more processors configured to execute instructions stored by a computer-readable medium for performing various operations, such as input/output, communication, data processing, and the like. The computing servers 102, 104, and 106 may communicate with each other and with other portable or stationary computing devices (e.g., other servers, personal computers, smartphones, or other appropriate computing devices) using wired and/or wireless network connections. Operations performed by one or more of the computing servers 102, 104, and 106 may be performed by a single server, or may be distributed to various other servers (e.g., servers included in a cloud computing and/or a peer-to-peer configuration).

Referring to the example data flow, during stage (A), data representations may be received of utterances in which one or more users have spoken one or more terms. For example, a user 110 can employ a computing device 112 (e.g., a smartphone, a voice over Internet Protocol (VoIP) phone, a personal computer with a microphone, or another suitable device) to provide speech data (e.g., voice queries, commands, communications, etc.) to the speech recognition server 102. Upon receiving the speech data, for example, the speech recognition server 102 can analyze acoustic signals included in the data, and can compute and classify sound features to identify a series of phones. To generate a transcription of an utterance, for example, the speech recognition server 102 can access one or more phonetic dictionaries (e.g., phonetic dictionary 114) to identify an association between the series of phones and one or more words or phrases, and can perform various speech recognition techniques (e.g., Hidden Markov models, neural networks, or other appropriate techniques). Moreover, in some implementations, speech data may be used to provide training examples for one or more models used for performing speech recognition.

During stage (B), terms and phonetic representations may be identified. For example, an external phonetic dictionary 120 (e.g., a published pronunciation guide) may provide data (e.g., terms, spellings, phonetic representations, pronunciations, etc.) for inclusion in the phonetic dictionary 114 (here shown as phonetic dictionary 114a) used by the speech recognition server 102. In the present example, the terms "derecho", "dingo", and "door" are initially provided for inclusion in the phonetic dictionary 114a, along with their respective phonetic representations. However, the external phonetic dictionary 120 in the present example may include various pronunciation inaccuracies, and the term "derecho" may be associated with an incorrect pronunciation (e.g., "de-reck-oh").

During stage (C), terms and rule-based phonetic representation estimates of the terms may be identified. For example, the search engine 106 may provide data associated with various queries (e.g., text-based queries, voice queries, etc.) entered by various users of an Internet search engine. Occasionally, a phonetic representation of a particular term may be unknown by the search engine 106 and/or the speech recognition server 102. For example, a search engine user may enter a search string including the term "darashio" (i.e., a misspelling of "derecho") to receive information about a recent weather event. In the present example, in addition to possibly returning search results related to the search term "darashio" (and/or one or more alternate spelling suggestions) the search server 106 may provide the term to the speech recognition server 102 for analysis. As the term "darashio" in the present example is a misspelling, the speech recognition server 102 may not have previous included an entry for the term in its phonetic dictionary 114 (here shown as phonetic dictionary 114a). Thus, the speech recognition server 102, for example, may use phonics rules to identify graphemes included in the term, and to determine a likely pronunciation. Upon determining a phonetic representation estimate (e.g., a likely pronunciation) of a term, for example, the speech recognition server 102 may store the estimate (e.g., "da-ray-sho") with the term (e.g., "darashio") in the phonetic dictionary 114a.

During stage (D), data associated with terms from a phonetic dictionary may be provided to a spelling correction engine. In the present example, the recently added (and previously unknown) term "darashio" may be provided by the speech recognition server 102 to the spelling correction server 104. As another example, multiple terms may be provided to the spelling correction server 104 as part of batch process for refining data included in the phonetic dictionary 114.

During stage (E), data associated with terms and spelling corrections may be received from the spelling correction engine. In the present example, the spelling correction server 104 may identify "darashio" as a common misspelling of the word "derecho". As the word "derecho" is a Spanish loan word, for example, its proper spelling and pronunciation may be unfamiliar to many English speakers. According to English phonics rules, for example, a likely pronunciation of the word may be "de-reck-oh". According to Spanish pronunciation standards, for example, an appropriate pronunciation of the word may be "de-retch-oh". According to general regional pronunciation conventions, for example, the word may be pronounced differently, such as "da-ray-sho". Thus, in the present example, as other users may also have previously misspelled "derecho" as "darashio", the spelling correction server 104 can provide such information to the speech recognition server.

During stage (F), a phonetic dictionary may be updated. For example, based on data associated with terms and spelling corrections provided by the spelling correction server 104, the speech recognition server 102 may update the phonetic dictionary 114 (here shown as phonetic dictionary 114b). In the present example, a phonetic representation (e.g., "da-ray-sho") associated with a misspelled term (e.g., "darashio") may be stored with its correctly spelled counterpart (e.g., "derecho"). Moreover, as the term "darashio" in the present example has been identified as a misspelling, it may be removed from the phonetic dictionary 114b.

As described in the preceding examples, phonetic dictionaries may be updated for use in speech recognition. As phonetic dictionaries may include a vast number of entries, automated techniques for revealing potential mistakes and/or omissions may be used to efficiently refine the dictionaries and to improve their suitability for use by speech recognition engines. Moreover, as new words may be added to a language and as acceptable pronunciations for various words may change over time, a dynamic technique for associating words with their pronunciations may ensure that phonetic dictionaries used by speech recognition engines are current.

Figure 2:
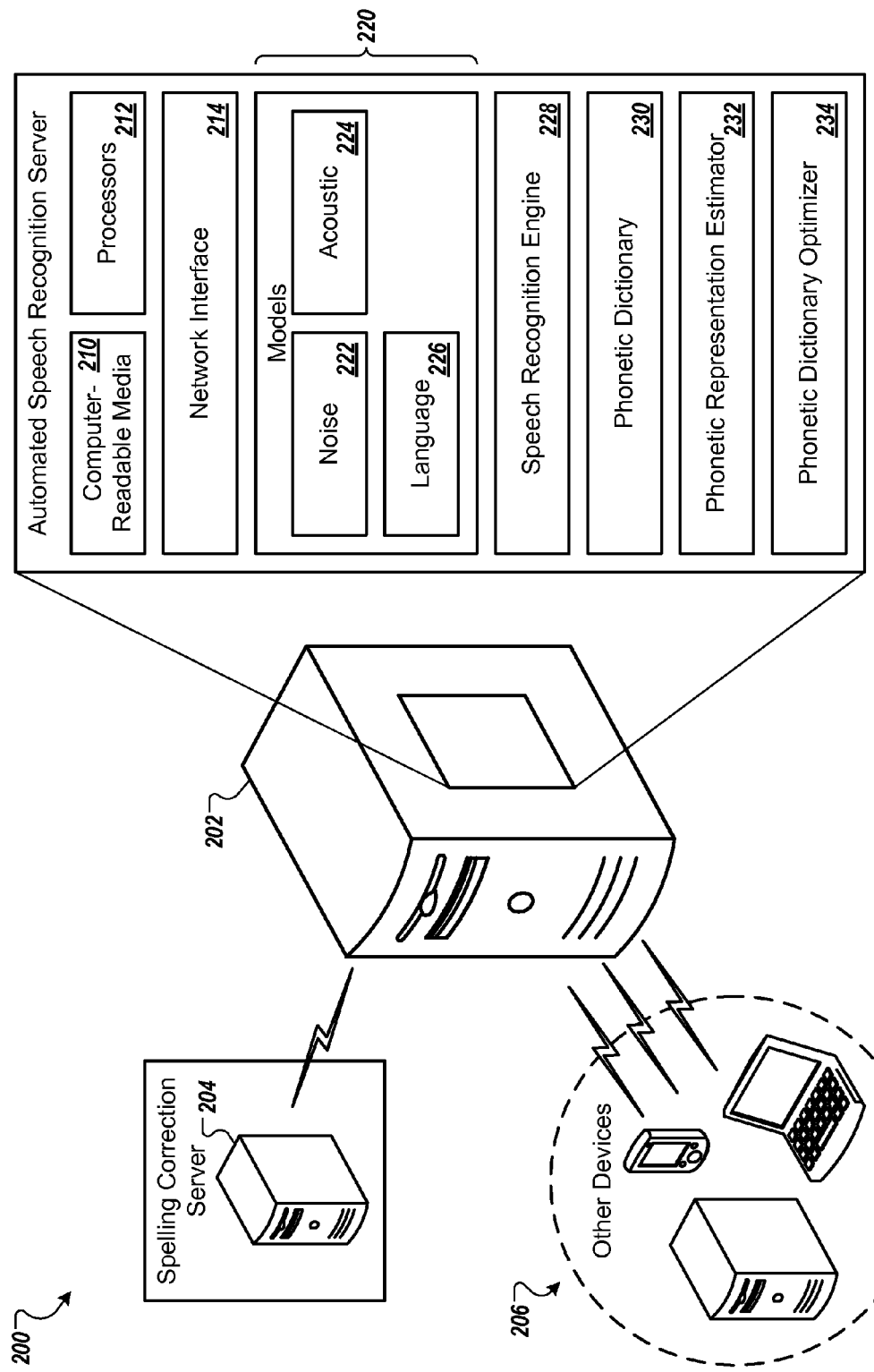

FIG. 2 is a diagram of an example system 200 that can update phonetic dictionaries. The system 200, for example, may include hardware and/or software components of one or more client computing devices and/or backend servers. In general, the system 200 can access a phonetic dictionary, identify a term in the dictionary that is a spelling correction for another term in the dictionary, and store (in the dictionary) a phonetic representation of the other term, with the term that is a spelling correction for the other term.

The system 200 may include an automated speech recognition server 202 (e.g., similar to the speech recognition server 102, shown in FIG. 1), a spelling correction server 204 (e.g., similar to the spelling correction server 104, also shown in FIG. 1), and one or more other computing devices 206 (i.e., portable or stationary client computing devices and/or servers). The speech recognition server 202, the spelling correction server 204 and the other computing devices 206 may communicate with each other over various suitable networks (e.g., local area networks (LANs), wide area networks (WANs), the Internet, etc.) using wired and/or wireless connections.

The speech recognition server 202 may include computer-readable media 210 (e.g., one or more floppy disk devices, hard disk devices, optical disk devices, tape devices, flash memory devices or other similar solid state memory devices, or an array of devices) for storing instructions (e.g., application program code) for performing the processes described herein. Further, the speech recognition server 202 may include one or more processors 212 configured to execute the instructions and to perform various device operations and data processing, and a network interface 214 to transmit data to and receive data from other computing devices (e.g., the spelling correction server 204, one or more of the other computing devices 206, etc.).

The speech recognition server 202 may use various models 220, such as a noise model 222, an acoustic model 224, and a language model 226 for performing speech recognition. The models 222, 224, and 226, for example, may include data and algorithms to be executed by a speech recognition engine 228. In general, noise models may include acoustic compensation and/or filtering mechanisms to reduce noise levels in audio signals. Acoustic compensation, for example, may digitally simulate the operation of a noise-cancelling microphone, using a sample of a noise field. Noise filtering, for example, may selectively limit components of an audio signal with respect to a given basis. In general, acoustic models may model contextual phonetic information across a population of speakers. To generate (or "train") an acoustic model, for example, voice data (e.g., audio recordings of various speakers) and corresponding transcriptions may be analyzed and compiled into statistical representations of sounds that are included in various terms. In general, language models may model the probabilities of various word sequences. A language model, for example, may be implemented as a series of n-grams, where the probability of a complete sentence occurring is the combined probability of the n-gram components. By using n-grams, for example, probability estimates may be generated for sentences that may not be represented in existing training data.

The speech recognition engine 228, for example, may coordinate and execute various models (e.g., the noise model 222, the acoustic model 224, and the language model 226), and may access various phonetic dictionaries (e.g., phonetic dictionary 230) to perform speech recognition and transcription. In the present example, the acoustic model 224 and the language model 226 may initially be trained, and parameters (e.g., representations of normalized frequency counts or histograms) associated with each of the models may be estimated. After training the acoustic model 224 and the language model 226, for example, the models may be compiled, and a search graph may be constructed from a combination of the models and phonetic representations (e.g., pronunciations) from the phonetic dictionary 230. After compiling the models 224, 226, for example, a search may be performed to identify an optimal path that aligns a sequence of feature vectors associated with a current utterance to the search graph. To transcribe an utterance of a phrase (e.g., "the cat died"), for example, the speech recognition engine 228 may use the noise model 222 to perform pre-processing (e.g., noise filtering) of acoustic signals associated with the utterance, and may coordinate the models (e.g., using a search graph) to identify a path that best matches the utterance. The path for a particular hypothesis (e.g., the sentence "the cat died"), for example, may include the sequence of context-dependent phonetic units as described by the phonetic dictionary 230, together with acoustic scores for the acoustic model 224 associated with each phonetic context in the corresponding string of phones, together with n-gram priors from the language model 226.

The phonetic dictionary 230 (e.g., similar to the phonetic dictionary 114, shown in FIG. 1), for example, may be implemented using databases, file systems, and/or other suitable data storage and retrieval mechanisms, and may include various terms (i.e., words, phrases, etc.) in association with one or more possible phonetic representations (e.g., pronunciations) of each of the terms. For example, a particular term (e.g., the term "probably") may be associated with a standard pronunciation (e.g., "prahb-eb-lee"), a pronunciation of a commonly used contraction (e.g., "prah-lee", "prob-lee", etc.), one or more regional pronunciations, and other possible pronunciations. Phonetic dictionaries, for example, may be compiled from various published sources and/or speech samples.

The speech recognition server 202 may access a phonetic representation estimator 232 (e.g., a hardware and/or software-based module) to estimate a phonetic representation (e.g., a pronunciation) of a term, based on its spelling. If a phonetic representation for a particular term is unknown or missing from the phonetic dictionary 230, for example, the speech recognition server 202 may use the phonetic representation estimator 232 to identify a likely pronunciation for the term, based on a set of language-based phonetic rules. In general, phonetic representations may be unknown or missing from a phonetic dictionary for newly coined or newly introduced terms that have not yet been analyzed and/or associated with speech data from a speaker (or from a suitably large population of speakers).

The speech recognition server 202 may access a phonetic dictionary optimizer 234 (e.g., a hardware and/or software-based module) to update one or more phonetic dictionaries. For example, if the speech recognition server 202 determines that a phonetic representation of particular term in the phonetic dictionary 230 is unknown, missing, or incorrect, the phonetic dictionary optimizer 234 may update the dictionary. As another example, the phonetic dictionary optimizer 234 may periodically update the phonetic dictionary 230 as part of a batch process.

Figure 3:
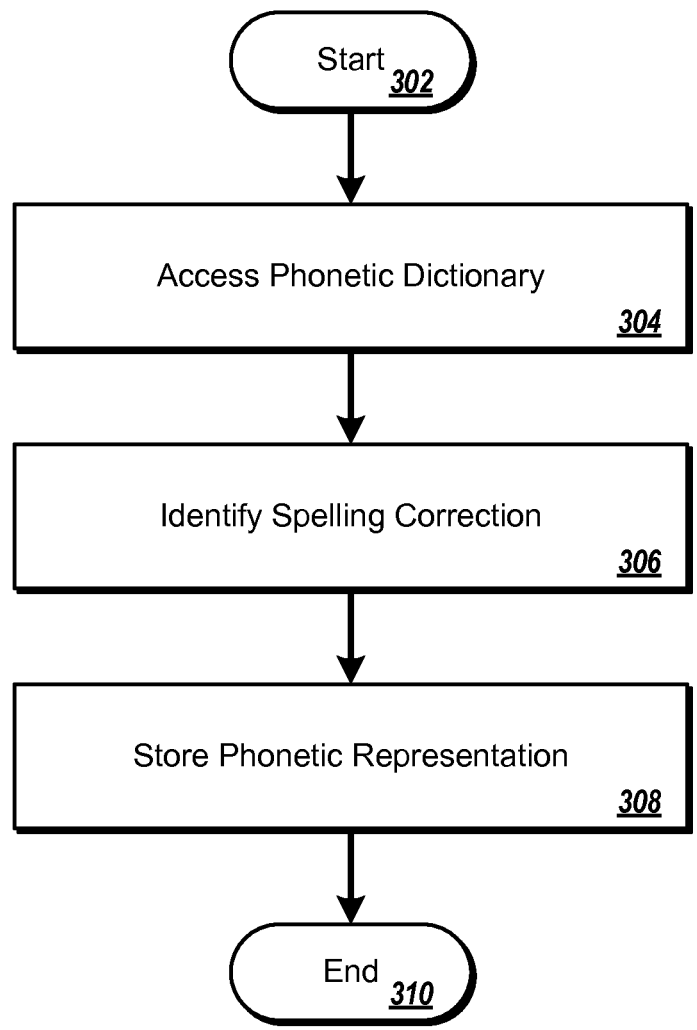
FIG. 3 is a flow chart illustrating an example process for updating a phonetic dictionary.

FIG. 3 is a flow chart illustrating an example process 300 for updating a phonetic dictionary. In some implementations, the process 300 may be performed by the systems 100 and/or 200, and will be described as such for clarity. Briefly, the process 300 includes accessing a phonetic dictionary, identifying a term in the dictionary that is a spelling correction for another term in the dictionary, and storing (in the dictionary) a phonetic representation of the other term, with the term that is a spelling correction for the other term.

In more detail, when the process 300 begins (302), a phonetic dictionary is accessed (304) that identifies terms and one or more phonetic representations associated with each term. Referring to FIG. 1, for example, the automated speech recognition server 102 can access the phonetic dictionary 114 (here shown as phonetic dictionary 114a). In the present example, various terms (e.g., "derecho", "dingo", "door", etc.) are included along with their respective phonetic representations.

In some implementations, each phonetic representation may include a sequence of phonemes. In general, a phoneme is a basic element of a spoken language (i.e., a representation of a speech sound), from which words in the language are built. For example, the term "dingo" may be associated with the phoneme sequence "/d//i//ng//go/". In some implementations, each phonetic representation may include a phonemic representation. Phonemic representations may generally include representations of subtle alternate pronunciations (i.e., allophones) of phonemes that may be used in particular contexts. For example, a native speaker may use an allophone of a particular phoneme, based on other phonemes (preceding and/or following phonemes) included in a word or phrase. In English, for example, various allophonic processes may include plosion (e.g., nasal plosion), devoicing of sonorants, devoicing of obstruents, lengthening and shortening vowels, and retraction.

In some implementations, before accessing a phonetic dictionary, one or more phonetic representations of a particular term may be obtained from an external phonetic dictionary. Further, the one or more phonetic representations may be stored in association with the particular term. Phonetic representations, for example, may include phonetic units (e.g., phonemes) identified by linguists, and may include distinct acoustic sounds identified (e.g., by acoustic clustering) in speech sample data. For example, speech sample data associated with one or more utterances of a particular term by one or more speakers may be analyzed to identify the centroids of the speech sounds included in the term. In the present example, the terms "derecho", "dingo", and "door" may be included in the external phonetic dictionary 120, and/or may have been included in speech data associated with one or more automated speech recognition system users (e.g., the user 110). The terms may be obtained by the speech recognition server 102, for example, and may be stored locally in its phonetic dictionary 114. Thus, for example, data from multiple phonetic dictionaries and other sources (e.g., acoustic speech samples, transcriptions, etc.) may be aggregated for use by the speech recognition server 102.

In some implementations, before accessing a phonetic dictionary, one or more automatically-generated phonetic representation estimates of a particular term may be obtained. Further, the one or more phonetic representation estimates may be stored as one or more phonetic representations associated with the particular term. For example, a particular term (e.g., the term "darashio") may have been entered by various users of an Internet search engine associated with the search server 106, and may be provided by the search server to the speech recognition server 102. As the term "darashio" a misspelling of "derecho") in the present example may not initially exist in the phonetic dictionary 114a, the speech recognition server 102 may add it. However, an appropriate pronunciation of the term "darashio" in the present example may be initially unknown. Referring to FIG. 2, for example, the automated speech recognition server 202 can use the phonetic representation estimator 232 to use phonics rules to identify an appropriate pronunciation of the term based on its constituent graphemes (e.g., letters), and may store a corresponding phonetic representation estimate (e.g., "da-ray-sho") with the term (e.g., "darashio") in the phonetic dictionary 230.

A determination (306) is performed of whether a particular term that is identified in a phonetic dictionary is a spelling correction for another term that is identified in the phonetic dictionary. In the present example, it may be determined that "derecho" is a spelling correction for the term "darashio". Alternately, in the present example, it may be determined that "darashio" is a misspelling of the term "derecho".

In some implementations, a particular term may include two or more words. For example, a term may include a commonly used phrase or a grouping of words, such as "thumbs up", "for sure", or "wicked awesome". Similar to contractions, for example, some words may assume different pronunciations when included in certain phrases (in contrast to being spoken individually) and thus may be more readily identified when considered in the context of a phrase.

In some implementations, determining that a particular term that is identified in a phonetic dictionary is a spelling correction for another term that is identified in the phonetic dictionary may include the use of a spelling correction engine. Data identifying at least a portion of the terms in the phonetic dictionary may be transmitted to the spelling correction engine, and data that identifies the particular term as a spelling correction for the other term may be received from the spelling correction engine. In the present example, data identifying the term "darashio" may be provided by the speech recognition server 202 to the spelling correction server 204. Upon receiving the data, for example, the spelling correction server 204 may provide data to the speech recognition server 202 that identifies the term "derecho" as a spelling correction of "darashio".

In some implementations, data that specifies a spelling correction confidence score may be received from a spelling correction engine. In general, a spelling correction confidence score may reflect a probability that a particular term is a spelling correction for another term. For example, the spelling correction server 204 may use probabilistic techniques to identify the likelihood (e.g., as a percentage or another suitable indicator) that a user has entered (e.g., typed) a term (e.g., "darashio") when the user had intended to enter a different term (e.g., "derecho"). In some implementations, data associated with search engine queries and results may be used to identify likely spelling corrections and spelling correction confidence scores. For example, if a significant number (or proportion) of search engine users have entered a search term (e.g., "darashio"), and have subsequently accessed content associated with a different term (e.g., web pages pertaining to a "derecho"), the entered search term may be identified as a likely misspelling. In the present example, as many users may have previously entered the term "darashio" and later accessed pages pertaining to a "derecho", the spelling correction server 204 may provide to the speech recognition server 202 a high confidence score that the term "derecho" is a spelling correction of the term "darashio".

One or more phonetic representations associated with the other term may be stored (308) in the phonetic dictionary, with the particular term that is a spelling correction for the other term, thereby ending the process (310). Referring to FIG. 1, for example, the speech recognition server 102 can store in the phonetic dictionary 114 (here shown as phonetic dictionary 114b) a phonetic representation associated with the other term (e.g., "darashio") with the particular term (e.g., "derecho") that is a spelling correction for the other term.

In some implementations, upon receiving data that specifies a spelling correction confidence score, a determination may be performed of whether the spelling correction confidence score satisfies a predetermined threshold. Further, in some implementations, one or more of the phonetic representations associated with the other term are stored with the particular term that is a spelling correction for the other term, only after determining that the spelling correction confidence score satisfies the predetermined threshold. Referring again to FIG. 2, for example, the spelling correction server 204 may provide to the speech recognition server 202 a high confidence score that the term "derecho" is a spelling correction of the term "darashio". In the present example, the speech recognition server 202 may compare the received spelling correction confidence score to the predetermined threshold (e.g., a percentage value or another suitable threshold), may determine that the confidence score satisfies the threshold, and may store one or more phonetic representations associated with the term "darashio", with the term "derecho".

In some implementations, storing one or more phonetic representations may include replacing, in the phonetic dictionary, one or more phonetic representations associated with the particular term that is a spelling correction for the other term, with one or more phonetic representations associated with the other term. In the present example, the phonetic representation "de-reck-oh" associated with the particular term "derecho" may be replaced with the phonetic representation "da-ray-sho" that is associated with the term "darashio". As another possibility, one or more phonetic representations of the other term may be added to a phonetic dictionary, in association with a particular term. For example, the phonetic dictionary 230 may currently include a correct phonetic representation of a term (e.g., the term "dingo"), and one or more alternate phonetic representations (e.g., a representation of an Australian pronunciation of the term "dingo") may also be added to the dictionary by the phonetic dictionary optimizer 234.

In some implementations, before storing one or more phonetic representations associated with the other term, with the particular term that is a spelling correction for the other term, one or more of the phonetic representations associated with the particular term may be deleted from the phonetic dictionary. For example, if a phonetic representation (e.g., a pronunciation) of a particular term is unlikely to be used by speakers of the term, and/or if the phonetic representation is likely to be confused with a different term by the speech recognition engine 228, the term may be deleted. In the present example, before storing the phonetic representation "da-ray-sho" that is associated with the term "darashio", with the particular term "derecho" (the spelling correction for "darashio"), the automated speech recognition server 202 may determine that a low percentage of speakers have used the pronunciation "de-reck-oh", and thus may use the phonetic dictionary optimizer 234 to delete the phonetic representation "de-reck-oh" from the phonetic dictionary 230.

In some implementations, after storing one or more phonetic representations associated with the other term, with the particular term that is a spelling correction for the other term, the other term and one or more of the phonetic representations associated with the other term may be deleted from the phonetic dictionary. For example, after storing the phonetic representation "da-ray-sho" that is associated with the term "darashio", with the particular term "derecho" (the spelling correction for "darashio"), the phonetic dictionary optimizer 234 may delete the term "darashio" and its corresponding phonetic representations from the phonetic dictionary 230. Thus, in the present example, the phonetic dictionary 230 may be maintained to include proper pronunciations and spellings.

In some implementations, a data representation of an utterance in which a user has spoken the particular term may be received. Further, the stored one or more phonetic representations associated with the particular term in the phonetic dictionary may be used in outputting the particular term as part of a transcription of the utterance. For example, a user of one of the other devices 206 (e.g., a smartphone) may utter an information request phrase, "When will this cursed derecho finally end?", using the pronunciation "da-ray-sho" for the term "derecho". In the present example, a data representation (e.g., acoustic signals) of the utterance may be received by the speech recognition server 202 for processing. The speech recognition server 202, for example, may generate a transcription of the request phrase, correctly identifying the user's pronunciation "da-ray-sho" as being an utterance of the term "derecho", having updated its phonetic dictionary 230. The transcription, for example, may be provided by the speech recognition server 202 to another of the devices 206 (e.g., an information server) for fulfillment of the user's request for information.

Figure 4:
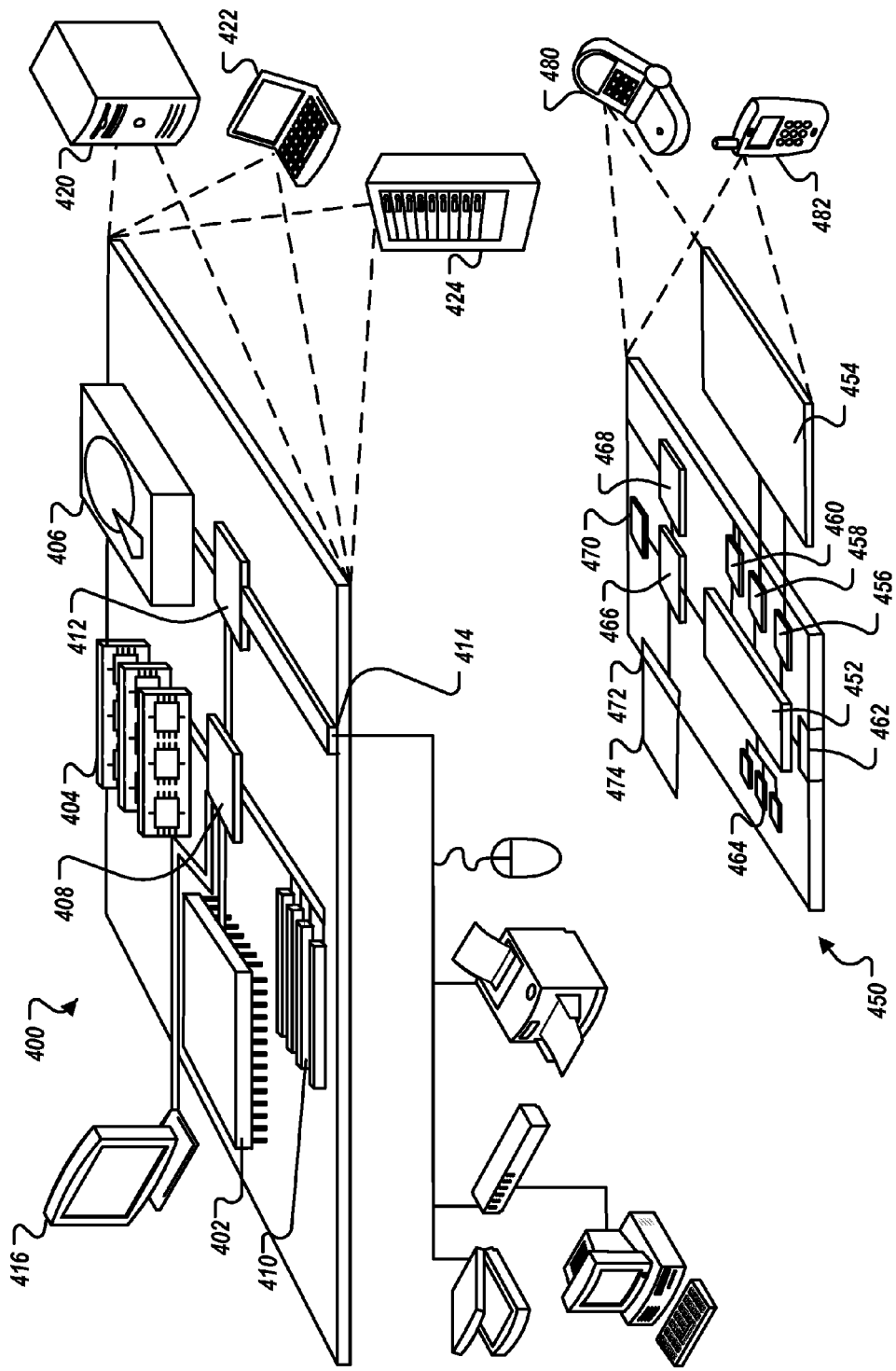
FIG. 4 shows an example of a generic computer device and a generic mobile computer device.

FIG. 4 shows an example of a generic computer device 400 and a generic mobile computer device 450, which may be used with the techniques described herein. Computing device 400 is intended to represent various forms of digital computers, such as laptops, desktops, workstations, personal digital assistants, servers, blade servers, mainframes, and other appropriate computers. Computing device 450 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 400 includes a processor 402, memory 404, a storage device 406, a high-speed interface 408 connecting to memory 404 and high-speed expansion ports 410, and a low speed interface 412 connecting to low speed bus 414 and storage device 406. Each of the components 402, 404, 406, 408, 410, and 412, are interconnected using various busses, and may be mounted on a common motherboard or in other manners as appropriate. The processor 402 may process instructions for execution within the computing device 400, including instructions stored in the memory 404 or on the storage device 406 to display graphical information for a GUI on an external input/output device, such as display 416 coupled to high speed interface 408. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 404 stores information within the computing device 400. In one implementation, the memory 404 is a volatile memory unit or units. In another implementation, the memory 404 is a non-volatile memory unit or units. The memory 404 may also be another form of computer-readable medium, such as a magnetic or optical disk.

The storage device 406 is capable of providing mass storage for the computing device 400. In one implementation, the storage device 406 may be or contain a computer-readable medium, such as a floppy disk device, a hard disk device, an optical disk device, or a tape device, a flash memory or other similar solid state memory device, or an array of devices, including devices in a storage area network or other configurations. A computer program product may be tangibly embodied in an information carrier. The computer program product may also contain instructions that, when executed, perform one or more methods, such as those described above. The information carrier is a computer- or machine-readable medium, such as the memory 404, the storage device 406, memory on processor 402, or a propagated signal.

The high speed controller 408 manages bandwidth-intensive operations for the computing device 400, while the low speed controller 412 manages lower bandwidth-intensive operations. Such allocation of functions is exemplary only. In one implementation, the high-speed controller 408 is coupled to memory 404, display 416 (e.g., through a graphics processor or accelerator), and to high-speed expansion ports 410, which may accept various expansion cards (not shown). In the implementation, low-speed controller 412 is coupled to storage device 406 and low-speed expansion port 414. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. It may also be implemented as part of a rack server system 424. In addition, it may be implemented in a personal computer such as a laptop computer 422. Alternatively, components from computing device 400 may be combined with other components in a mobile device (not shown), such as device 450. Each of such devices may contain one or more of computing device 400, 450, and an entire system may be made up of multiple computing devices 400, 450 communicating with each other.

Computing device 450 includes a processor 452, memory 464, an input/output device such as a display 454, a communication interface 466, and a transceiver 468, among other components. The device 450 may also be provided with a storage device, such as a microdrive or other device, to provide additional storage. Each of the components 450, 452, 464, 454, 466, and 468, are interconnected using various buses, and several of the components may be mounted on a common motherboard or in other manners as appropriate.

The processor 452 may execute instructions within the computing device 450, including instructions stored in the memory 464. The processor may be implemented as a chipset of chips that include separate and multiple analog and digital processors. The processor may provide, for example, for coordination of the other components of the device 450, such as control of user interfaces, applications run by device 450, and wireless communication by device 450.

Processor 452 may communicate with a user through control interface 458 and display interface 456 coupled to a display 454. The display 454 may be, for example, a TFT LCD (Thin-Film-Transistor Liquid Crystal Display) or an OLED (Organic Light Emitting Diode) display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may be provide in communication with processor 452, so as to enable near area communication of device 450 with other devices. External interface 462 may provide, for example, for wired communication in some implementations, or for wireless communication in other implementations, and multiple interfaces may also be used.

The memory 464 stores information within the computing device 450. The memory 464 may be implemented as one or more of a computer-readable medium or media, a volatile memory unit or units, or a non-volatile memory unit or units. Expansion memory 474 may also be provided and connected to device 450 through expansion interface 472, which may include, for example, a SIMM (Single In Line Memory Module) card interface. Such expansion memory 474 may provide extra storage space for device 450, or may also store applications or other information for device 450. Specifically, expansion memory 474 may include instructions to carry out or supplement the processes described above, and may include secure information also. Thus, for example, expansion memory 474 may be provide as a security module for device 450, and may be programmed with instructions that permit secure use of device 450. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 464, expansion memory 474, memory on processor 452, or a propagated signal that may be received, for example, over transceiver 468 or external interface 462.

Device 450 may communicate wirelessly through communication interface 466, which may include digital signal processing circuitry where necessary. Communication interface 466 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 468. In addition, short-range communication may occur, such as using a Bluetooth, WiFi, or other such transceiver (not shown). In addition, GPS (Global Positioning System) receiver module 470 may provide additional navigation- and location-related wireless data to device 450, which may be used as appropriate by applications running on device 450.

Device 450 may also communicate audibly using audio codec 460, which may receive spoken information from a user and convert it to usable digital information. Audio codec 460 may likewise generate audible sound for a user, such as through a speaker, e.g., in a handset of device 450. Such sound may include sound from voice telephone calls, may include recorded sound (e.g., voice messages, music files, etc.) and may also include sound generated by applications operating on device 450.

The computing device 450 may be implemented in a number of different forms, as shown in the figure. For example, it may be implemented as a cellular telephone 480. It may also be implemented as part of a smartphone 482, personal digital assistant, or other similar mobile device.

Various implementations of the systems and techniques described here may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The systems and techniques described here may be implemented in a computing system that includes a back end component (e.g., as a data server), or that includes a middleware component (e.g., an application server), or that includes a front end component (e.g., a client computer having a graphical user interface or a Web browser through which a user may interact with an implementation of the systems and techniques described here), or any combination of such back end, middleware, or front end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A computer-implemented method comprising:
identifying, from among a set of query terms, a particular query term that (i) does not occur in a lexicon of terms, and (ii) has no designated, canonical phonetic representation in a pronunciation phonetic dictionary, wherein a canonical phonetic representation comprises a sequence of phonemes;
generating a phonetic representation estimate for the particular query term that (i) does not occur in the lexicon of terms, and (ii) has no designated, canonical phonetic representation in the pronunciation phonetic dictionary;

transmitting data identifying at least a portion of a term that does occur in the lexicon of terms and the particular query term to a spelling correction server;

receiving, from the spelling correction server, data that specifies a spelling correction confidence score, wherein the spelling correction confidence score reflects a probability that the term that does occur in the lexicon of terms is a correct spelling of the particular query term;

determining that the spelling correction confidence score satisfies a predetermined threshold; and in response to determining that the spelling correction confidence score satisfies a predetermined threshold, designating, by one or more computing devices, the phonetic representation estimate for the particular query term as a canonical phonetic representation, in the phonetic dictionary, of the term that does occur in the lexicon of terms.

2. The method of claim 1, wherein generating a phonetic representation estimate for the particular query term that (i) does not occur in the lexicon of terms, and (ii) has no designated, canonical phonetic representation in the phonetic pronunciation dictionary, comprises:

estimating a pronunciation of the particular query term based on one or more phonic rules for graphemes included in the particular query term.

3. The method of claim 1, wherein the phonetic representation estimate comprises a phonemic representation.

4. The method of claim 1, wherein the phonetic representation estimate comprises a sequence of phonemes.

5. The method of claim 1, wherein the term that does occur in the lexicon of terms comprises two or more words.

6. The method of claim 1, comprising:

after generating the phonetic representation estimate for the particular query term that (i) does not occur in the lexicon of terms, and (ii) has no designated, canonical phonetic representation in the phonetic pronunciation dictionary, adding the particular query term to the lexicon of terms; and after designating, by one or more computing devices, the phonetic representation estimate for the particular query term as the canonical phonetic representation, in the phonetic pronunciation dictionary, of the term that does occur in the lexicon of terms, deleting the particular query term from the lexicon of terms.

7. The method of claim 1, wherein designating, by one or more computing devices, the phonetic representation estimate for the particular query term as a canonical phonetic representation, in the phonetic pronunciation dictionary, of the term that does occur in the lexicon of terms comprises:

replacing one or more phonetic representations associated with the term that does occur in the lexicon of terms with the phonetic representation estimate.

8. The method of claim 1, comprising:

receiving a data representation of an utterance in which a user has spoken the term that does occur in the lexicon of terms; and using the phonetic representation estimate for the particular query term, in outputting the term that does occur in the lexicon of terms as part of a transcription of the utterance.

9. A system comprising:

one or more computers and one or more storage devices storing instructions that are operable, when executed by the one or more computers, to cause the one or more computers to perform operations comprising:

identifying, from among a set of query terms, a particular query term that (i) does not occur in a lexicon of terms, and (ii) has no designated, canonical phonetic representation in a pronunciation phonetic dictionary, wherein a canonical phonetic representation comprises a sequence of phonemes;

generating a phonetic representation estimate for the particular query term that (i) does not occur in the lexicon of terms, and (ii) has no designated, canonical phonetic representation in the pronunciation phonetic dictionary;

transmitting data identifying at least a portion of a term that does occur in the lexicon of terms and the particular query term to a spelling correction server;

receiving, from the spelling correction server, data that specifies a spelling correction confidence score, wherein the spelling correction confidence score reflects a probability that the term that does occur in the lexicon of terms is a correct spelling of the particular query term;

determining that the spelling correction confidence score satisfies a predetermined threshold; and in response to determining that the spelling correction confidence score satisfies a predetermined threshold, designating, by one or more computing devices, the phonetic representation estimate for the particular query term as a canonical phonetic representation, in the phonetic dictionary, of the term that does occur in the lexicon of terms.

10. The system of claim 9, wherein generating a phonetic representation estimate for the particular query term that (i) does not occur in the lexicon of terms, and (ii) has no designated, canonical phonetic representation in the phonetic pronunciation dictionary, comprises:

estimating a pronunciation of the particular query term based on one or more phonic rules for graphemes included in the particular query term.

11. The system of claim 9, the operations comprising:

after generating the phonetic representation estimate for the particular query term that (i) does not occur in the lexicon of terms, and (ii) has no designated, canonical phonetic representation in the phonetic pronunciation dictionary, adding the particular query term to the lexicon of terms; and after designating, by one or more computing devices, the phonetic representation estimate for the particular query term as the canonical phonetic representation, in the phonetic pronunciation dictionary, of the term that does occur in the lexicon of terms, deleting the particular query term from the lexicon of terms.

12. A non-transitory computer-readable storage device storing software comprising instructions executable by one or more computers which, upon such execution, cause the one or more computers to perform operations comprising:

identifying, from among a set of query terms, a particular query term that (i) does not occur in a lexicon of terms, and (ii) has no designated, canonical phonetic representation in a pronunciation phonetic dictionary, wherein a canonical phonetic representation comprises a sequence of phonemes;

generating a phonetic representation estimate for the particular query term that (i) does not occur in the lexicon of terms, and (ii) has no designated, canonical phonetic representation in the pronunciation phonetic dictionary;

transmitting data identifying at least a portion of a term that does occur in the lexicon of terms and the particular query term to a spelling correction server;

receiving, from the spelling correction server, data that specifies a spelling correction confidence score, wherein the spelling correction confidence score reflects a probability that the term that does occur in the lexicon of terms is a correct spelling of the particular query term;

determining that the spelling correction confidence score satisfies a predetermined threshold; and in response to determining that the spelling correction confidence score satisfies a predetermined threshold, designating, by one or more computing devices, the phonetic representation estimate for the particular query term as a canonical phonetic representation, in the phonetic dictionary, of the term that does occur in the lexicon of terms.

13. The medium of claim 12, wherein generating a phonetic representation estimate for the particular query term that (i) does not occur in the lexicon of terms, and (ii) has no designated, canonical phonetic representation in the phonetic pronunciation dictionary, comprises:

estimating a pronunciation of the particular query term based on one or more phonic rules for graphemes included in the particular query term.

14. The medium of claim 12, the operations comprising:

after generating the phonetic representation estimate for the particular query term that (i) does not occur in the lexicon of terms, and (ii) has no designated, canonical phonetic representation in the phonetic pronunciation dictionary, adding the particular query term to the lexicon of terms; and after designating, by one or more computing devices, the phonetic representation estimate for the particular query term as the canonical phonetic representation, in the phonetic pronunciation dictionary, of the term that does occur in the lexicon of terms, deleting the particular query term from the lexicon of terms.

\* \* \* \* \*